US006564652B1

(12) United States Patent
Zoccola, Jr.

(10) Patent No.: US 6,564,652 B1
(45) Date of Patent: May 20, 2003

(54) X-WIRE PROBE FOR VELOCITY MEASUREMENTS NEAR THE DOWNSTREAM EDGE OF AN APERTURE

(75) Inventor: Paul J. Zoccola, Jr., Gaithersburg, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/832,155

(22) Filed: Apr. 9, 2001

(51) Int. Cl.$^{7}$ .................................................. G01P 5/06
(52) U.S. Cl. .................................................. 73/861.85
(58) Field of Search .............................. 73/204, 204.25, 73/204.22, 204.23, 204.24, 861.66, 861.65, 861.85; 374/179, 147

(56) References Cited

U.S. PATENT DOCUMENTS

| | | | | |
|---|---|---|---|---|
| 2,923,152 A | * | 2/1960 | Mabry, Jr. et al. | 73/182 |
| 3,702,566 A | * | 11/1972 | Obermaier et al. | 73/204 |
| 4,016,758 A | * | 4/1977 | Taylor | 73/204 |
| 4,559,835 A | * | 12/1985 | DeBaum | 73/861.66 |
| 4,648,271 A | * | 3/1987 | Woolf | 73/204 |
| 4,701,051 A | | 10/1987 | Buchhave et al. | |
| 5,189,910 A | * | 3/1993 | Onda | 73/204.22 |
| 5,233,865 A | * | 8/1993 | Rossow | 73/147 |
| 5,241,866 A | * | 9/1993 | Rossow | 73/861.66 |
| 5,427,452 A | * | 6/1995 | Stuart | 374/179 |
| 6,164,411 A | | 12/2000 | Zoccola, Jr. | |

OTHER PUBLICATIONS

Paul J. Zoccola, Jr., "Experimental Investigation of Flow–Induced Cavity Resonance," NSWCCD–TR–2000/010, Jun. 2000, Signatures Directorate Technical Report, Naval Surfaces Warfare Center, Carderock Division, West Bethseda, Maryland, 20817–5700 (Please Note: A copy of this document is included in the above–indicated application as "Appendix A," and hence is not appended hereto.).

"DOD Printing Requisition/Order," DD Form 882 (Navy). Requisition No.: N00167–00–PT–15152; Form/Publication No. and Title: NSWCCD–TR–2000/010, "Experimental Investigation of Flow–Induced Cavity Resonance"; pp.: 183, Date of Request: Jul. 24, 2000; For Reference Consult: Paul Zoccola.

TSI Incorporated website (TSI Incorporated, Laser Diagnostic Instruments, P.O. Box 64204, St. Paul, Minnesota, 55164).

http://www.tsi.com/fluid/homepage/fmidhome.htm (2 pp; Mar. 14, 2001).

http://www.tsi.com/fluid/products/products.htm (1 p; Mar. 14, 2001).

http://www.tsi.com/fluid/contact/contact.htm (2 pp; Mar. 14, 2001).

http://www.tsi.com/fluid/products/ta/2d_cross.htm (3 pp; Mar. 14, 2001).

(List continued on next page.)

*Primary Examiner*—Hezron Williams
*Assistant Examiner*—Jewel V. Thompson
(74) *Attorney, Agent, or Firm*—Howard Kaiser

(57) ABSTRACT

A velocity measurement probe comprises a straight body, four bent prongs projecting from the body and two cross-wires secured by the prongs. The prong tips are at right angles to the opposite ends of the prongs, which project at first in the body's axial direction. The probe in its entirety lies in a first geometric plane. The two cross-wires, retained at the tips of the prongs, lie in a second geometric plane which is orthogonal to the first geometric plane and which is parallel to the body's geometric axis. The probe is typically adaptable to connection with an anenometer, and is especially suitable for measuring the velocities of fluids at remote locations of an aperature, such as at an apertural edge which is directionally downstream of the fluid flow.

18 Claims, 5 Drawing Sheets

ℓ
ℓ″
ℓ′
18
b
12
30
26
14
b
22
24
d
10
r
28
w
16
ANEMOMETER
40

OTHER PUBLICATIONS

Dantec Measurement Technology A/S website (Dantec Measurement Technology A/S, Tonsbakken 16–18, P.O. Box 121, DK–2740 Skovlunde, Denmark).

http://www.dantecmt.com/About/Index.html (2 pp; Mar. 14, 2001).

http://www.dantecmt.com/Contact/Index.html (2 pp; Mar. 14, 2001).

http://www.dantecmt.com/CTA/System/probe/Support__dual/Index.html (2 pp; Mar. 14, 2001).

http://measurement.butik.jubii.dk/category.pml?cat=1298951 (1 p; Mar. 14, 2001).

http://www.dantecmt.com/CTA/System/probe/Dual__gold/Index.html (4 pp; Mar. 14, 2001).

http://measurem . . . /product.pml?prod=1297961? main=product.pml?prod=129796 (1 p; Mar. 14, 2001).

http://measurem . . . /product.pml?prod=1297971? main=product.pml?prod=129797 (1 p; Mar. 14, 2001).

http://measurem . . . /product.pml?prod=1297981? main=product.pml?prod=129798 (1 p; Mar. 14, 2001).

http://measurem . . . /product.pml?prod=1297991? main=product.pml?prod=129799 (1 p; Mar. 14, 2001).

"Probes for Hot–Wire Anemometry," Dantec Measurement Technology A/S catalog, 27 pp, Dantec Measurement Technology A/S, Tonsbakken 16–18, P.O. Box 121, DK–2740 Skovlunde, Denmark.

* cited by examiner 5
38
36
6
6

FLOW DIRECTION
32
34
5

X-WIRE PROBE FOR VELOCITY MEASUREMENTS NEAR THE DOWNSTREAM EDGE OF AN APERTURE

CROSS-REFERENCE TO RELATED APPLICATION

This patent application is related to the nonprovisional U.S. patent application being filed concurrently herewith, hereby incorporated herein by reference, entitled "Method for Measuring Vorticity," sole inventor Paul J. Zoccola, Jr, application Ser. No. 09/832,158, filing date Apr. 09, 2001.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to methods and apparatuses for measuring velocities pertaining to the flow of fluids, more particularly to probe-like devices used in association with anemometers for measuring such velocities.

The x and y components of velocity of two-dimensional fluid flow are known to be measurable using a hot-wire anemometer in combination with a cross-wire (or x-wire) probe. Two-wire probes such as x-wire probes represent a genre of hot-wire probes. X-wire probes comprise prongs which support two sensor wires such that the two wires are perpendicular to each other in the measurement plane of interest and are separated by a small distance in the out-of-plane direction.

Most frequently, velocity measurements are made so that the prongs are oriented in the primary fluid flow direction, so as to not interfere with fluid flow over the wires; a probe used in this manner is referred to as an "in-line" probe. The prongs may also be oriented perpendicular to the plane of interest; a probe used in this manner is referred to as a "cross-flow" probe.

Probes with varying designs are commercially available. Some probes are "straight" probes, having prongs that are oriented along the axis of the probe body; these may be used as either in-line probes or cross-flow probes. Also available are so-called "boundary layer" probes, wherein the prongs of an in-line probe are curved approximately ninety degrees (90°) so that measurements of flow along a boundary (e.g., a wall) may be made very close to the boundary.

None of these conventional probe designs is adequate for making velocity measurements in a wall aperture.

A conventional straight probe oriented in the in-line direction can be used for making velocity measurements in an aperture only if the aperture is longer than the probe and its support; even under such circumstances, such an in-line probe will be incapable of making measurements closer to the downstream edge than the length of the probe and its support.

A conventional straight probe oriented in the cross-flow direction is ordinarily impractical for making velocity measurements in an aperture, because the prongs will interfere with fluid flow over the probe, rendering the measurements highly inaccurate. Such a cross-flow probe will be useful for such purposes only if the cross-stream dimension of the aperture is greater than length of the probe and its support.

A boundary layer probe also proves unsatisfactory for purposes of making velocity measurements in an aperture. A boundary layer probe does not require a large cross-stream dimension; however, a boundary layer probe is limited, insofar as how close it can get to the downstream edge, by interference of the prongs with the downstream edge. In many applications, the boundary layer probe cannot achieve sufficient closeness.

Accordingly, commercially available probes are not practical for measuring x and y velocity components very close to the downstream edge of an aperture. This deficiency is especially manifest when it is desirable to make measurements in an entire aperture, including the aperture region which is close to the downstream edge.

Among the many applications of hot-wire probes are those involving measurement of vorticity, which requires measurements of velocity at more than one location. Hot-wire probes have been used to simultaneously measure the velocity vector at several locations; however, the hot-wire probes known for measuring vorticity typically require at least six wires, and thus are rather complex.

SUMMARY OF THE INVENTION

In view of the foregoing, it is an object of the present invention to provide method and apparatus for making fluid velocity measurements in an aperture.

It is another object of the present invention to provide method and apparatus for making fluid velocity measurements in a region of an aperture which is proximate the downstream edge of the aperture.

It is a further object of the present invention to provide method and apparatus for making fluid velocity measurements in an entire aperture.

Another object of the present invention is to provide method and apparatus for measuring fluid vorticity using relatively uncomplicated probe instrumentation.

In accordance with many embodiments of the present invention, a fluid velocity measurement device comprises an approximately linear member, a set of nonlinear prongs and an x-wire combination. The member is approximately characterized by a member axis. The member has a member axial extremity. The prongs protrude from the member at the member axial extremity. The prongs have corresponding prong tips distanced from the member axial extremity. The x-wire combination communicates with the prong tips. The device approximately defines a device plane passing through the device. The x-wire combination approximately defines an x-wire plane passing through the x-wire combination. The x-wire plane and the member axis are approximately parallel to each other. The x-wire plane and the device plane are approximately perpendicular to each other.

The present invention typically features a novel combination of indicia of both a boundary layer probe and a cross-flow probe. The inventive probe is similar to a boundary layer probe insofar as the prongs are curved approximately ninety degrees (90°) from the probe (and probe support). However, according to a conventional boundary layer probe, the wires are disposed in a manner which furthers utilization of the probe as an in-line probe. In contrast, the present invention uniquely disposes the wires in a manner which furthers utilization of the probe as a cross-flow probe.

The present invention was motivated by the problem of how to measure x and y velocity components close to the downstream edge of an aperture. The present invention advantageously allows velocity measurements to be made in the entire aperture, including the region close to the downstream edge. When the inventor originally consulted several individuals with expertise in hot-wire measurements, it became apparent that commercially available probes were unsatisfactory for purposes of effecting velocity measurements proximate the downstream edge of an aperture.

The suggestions offered by the experts all involved using cross-flow or in-line probes supported with structures inside the wall aperture. In accordance with the inventor's existing experimental set-up, all previous measurements had been made by the inventor with the probe supported and positioned using an external traverse system. The experts' suggestions would have been difficult to implement in the context of the inventor's existing experimental setup, and in any case would not have allowed measurements over the full range of out-of-plane positions. In contrast, the probe device according to this invention not only lends itself to being situated external to the aperture, but also is capable of effecting velocity measurements over the full range of out-of-plane positions, thereby at least substantially covering the entire aperture.

Accordingly, the present invention advantageously permits x-wire measurements of fluid velocity at all locations inside a wall aperture, including the region very close to the downstream edge. Further advantageously, the inventive probe may be supported externally of the wall, and may be freely and quickly moved to any position inside or outside of the aperture, and without having to make any setup changes.

The above-noted concurrently filed application entitled "Method for Measuring Vorticity" discloses an inventive methodology for effecting vorticity measurements. The x-wire probe according to this invention lends itself to efficacious use in association with the inventive vorticity measurement methodology. With regard to the measurement of vorticity, an advantage of using the inventive x-wire probe disclosed herein derives from its relative simplicity as compared with the more complex hot-wire probes which have been known for measuring vorticity. It is emphasized, however, that the present invention admits of practice for measuring fluid velocity in multifarious applications, including those related to vorticity and those unrelated to vorticity.

Other objects, advantages and features of this invention will become apparent from the following detailed description of the invention when considered in conjunction with the accompanying drawings.

Hereby incorporated herein by reference is the following 180-page U.S. Navy technical report which discloses various aspects of the present invention: Paul J. Zoccola. Jr., "Experimental Investigation of Flow-Induced Cavity Resonance," NSWCCD-TR-2000/010, June 2000, Signatures Directorate Technical Report, Naval Surface Warfare Center, Carderock Division, West Bethesda, Md., 20817-5700. The substance of this report is also available under reference number 9969545 from Bell and Howell Company, Skokie, Ill. in the form of the inventor's doctoral dissertation. This dissertation is also expected to be available from the library of the Catholic University of America, Washington, D.C.

BRIEF DESCRIPTION OF THE DRAWINGS

In order that the present invention may be clearly understood, it will now be described, by way of example, with reference to the accompanying drawings, wherein like numbers indicate the same or similar components, and wherein.

DETAILED DESCRIPTION OF THE INVENTION

Figure 1:
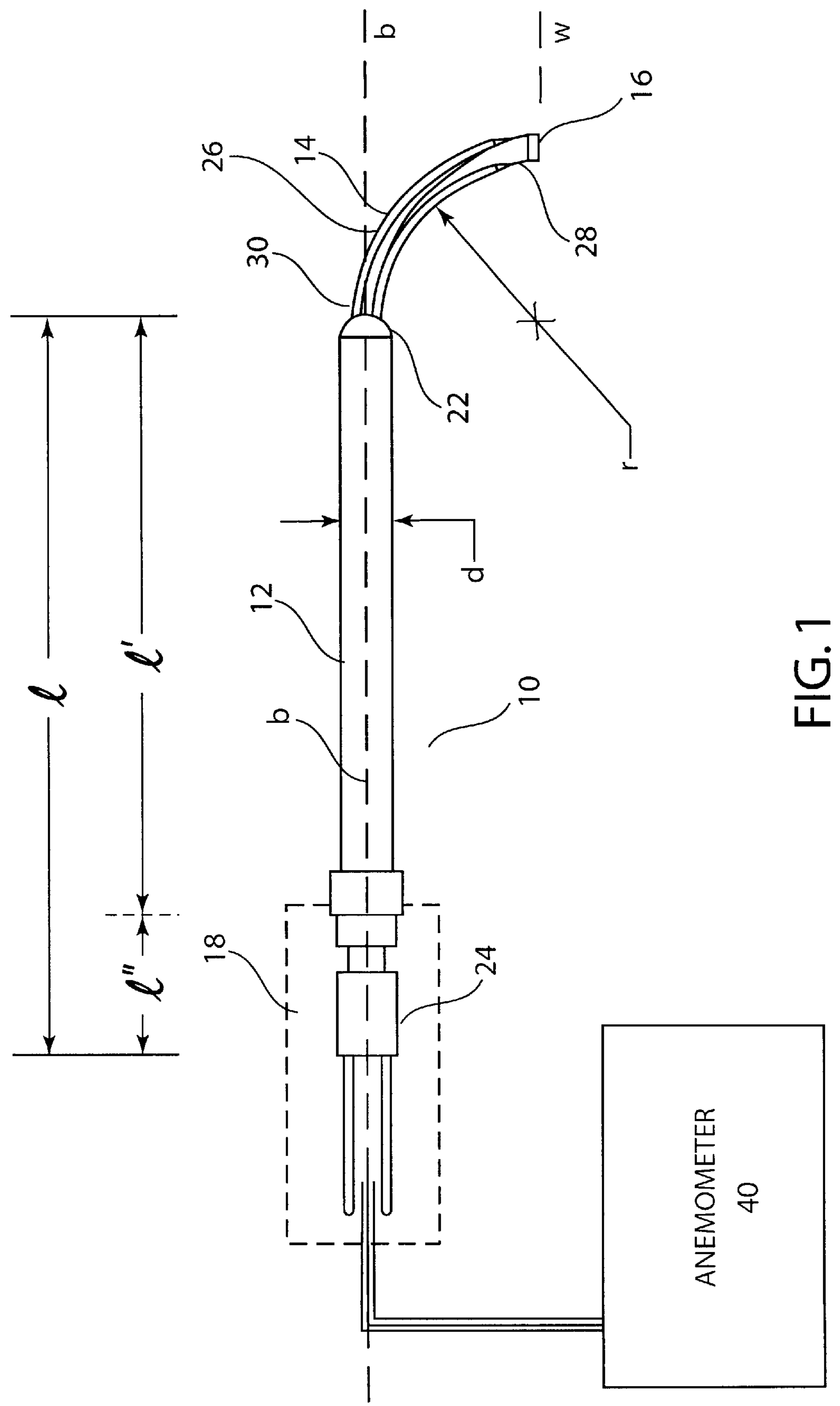
FIG. 1 is a diagrammatic side elevation view of an embodiment of an x-wire probe in accordance with the present invention.
Figure 2:
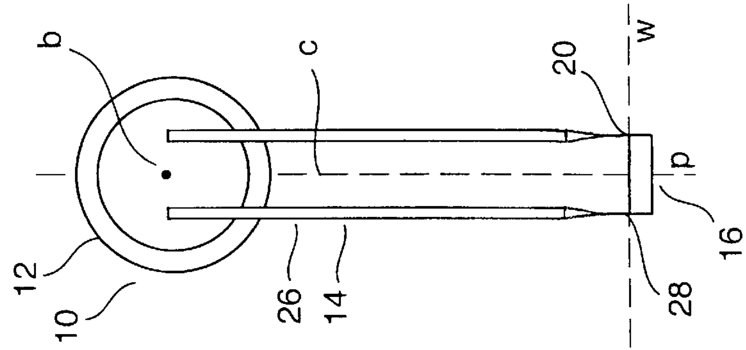
FIG. 2 is a diagrammatic front elevation view of the inventive embodiment shown in FIG. 1.
Figure 3:
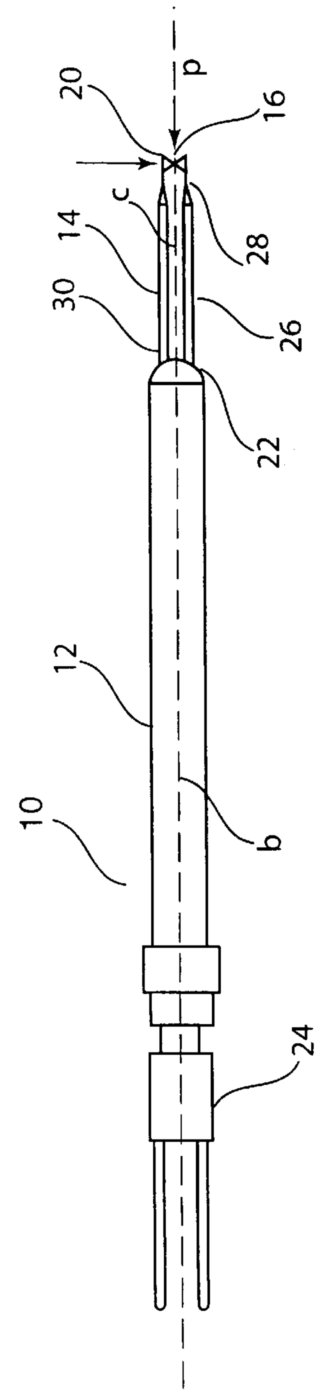
FIG. 3 is a diagrammatic top plan view of the inventive embodiment shown in FIG. 1.

Referring now to FIG. 1, FIG. 2 and FIG. 3, inventive x-wire probe 10 includes a probe body 12, four prongs 14 and two sensor wires 16. According to typical inventive practice, a probe support 18 holds probe 10 in place.

The approximately straight elongate body 12 has a fore body end 22 and an aft body end 24. Body 12 approximately defines an imaginary longitudinal body axis b. Although probe body 12 is shown in FIG. 1 and FIG. 3 to have an approximately cylindrical shape or cylindroid character, inventive practice can provide any generally linear and oblong (e.g., slender) inventive body shape which is generally characterized by longitudinal axial symmetry. The four bent prongs 14 together approximately describe an approximately unitarily bent prong configuration 26 which has a fore prong configuration end 28 and an aft prong configuration end 30. Probe body 12 is configured at aft body end 24 for adaptability to coupling with probe support 18.

The four prongs 14 project outward from probe body 12 and are bent (curved) approximately ninety degrees (90°) in terms of the relationship between fore prong configuration end 28 and aft prong configuration end 30. Prongs 14 each project from body 12 at fore body end 22 so that aft prong configuration end 30 is adjacent fore body end 22. At aft prong configuration end 30, a finite length of each prong 14 is approximately parallel to (or coaxial with) body axis b. Prong configuration 26 approximately defines an imaginary longitudinal prong axis c. Probe 10 approximately defines an imaginary probe plane p in which probe 10 lies; in particular, body axis b and prong axis c each approximately lie in probe plane p.

Prongs 14 have prong tips 20, located at fore prong configuration end 28. The two sensor wires 16 are attached to tips 20 of prongs 14 so as to form an "x" or "cross-wire" shape defining an imaginary plane w which is about normal to the tips 20 of prongs 14. At fore prong configuration end 28, each wire 16 is held by two diagonally opposite prongs 14. Wires 16 contiguously (slightly separated in the out-of-plane direction) and approximately normally cross each other so as to approximately define cross-wire plane w. "X" plane w is disposed approximately parallel relative to body axis b, and is disposed approximately normally relative to probe plane p.

Figure 4:
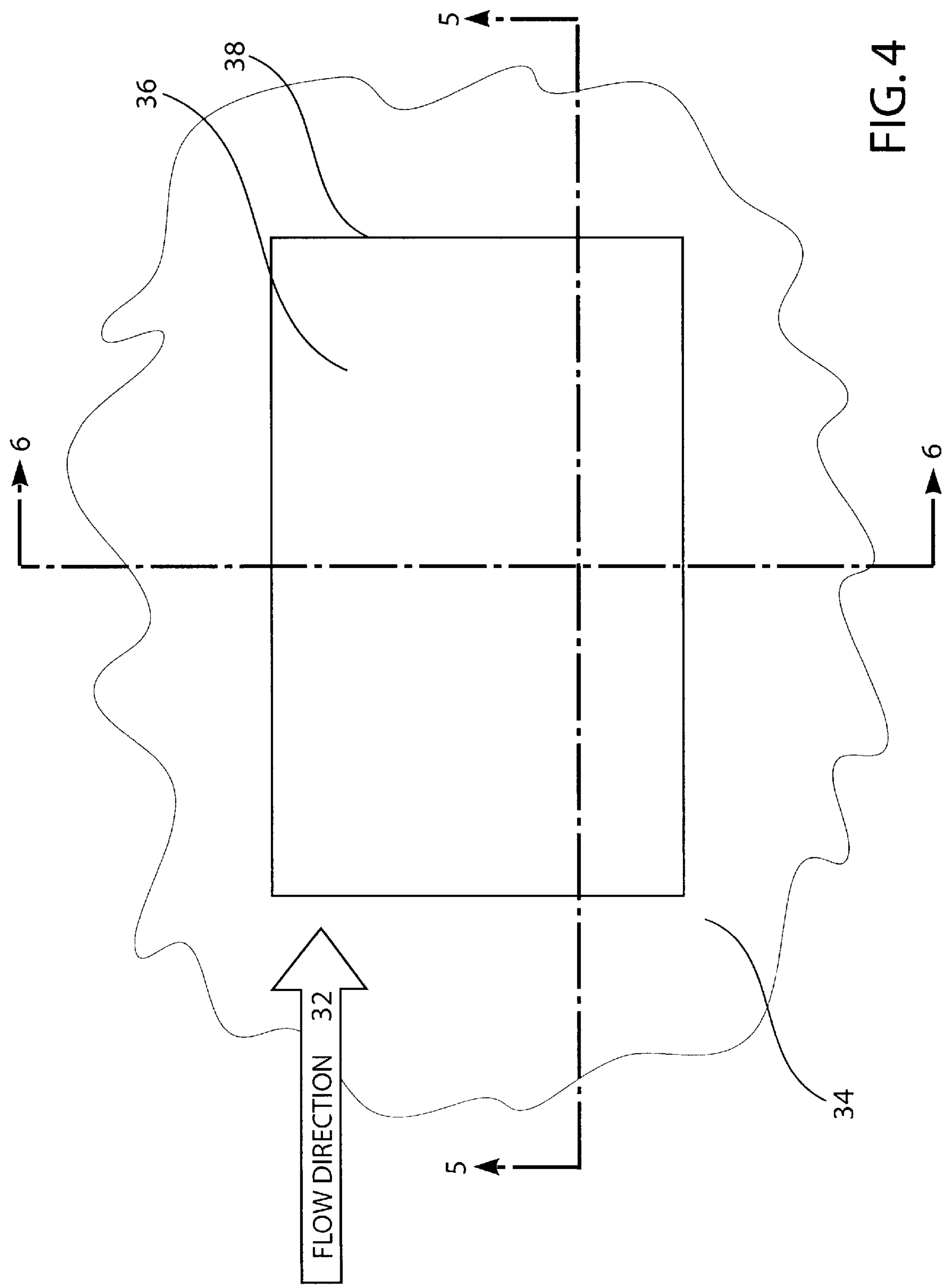
FIG. 4 is a diagrammatic front elevation view of a vertical wall having an aperture, wherein the flow direction is approximately parallel to the wall surface.
Figure 5:
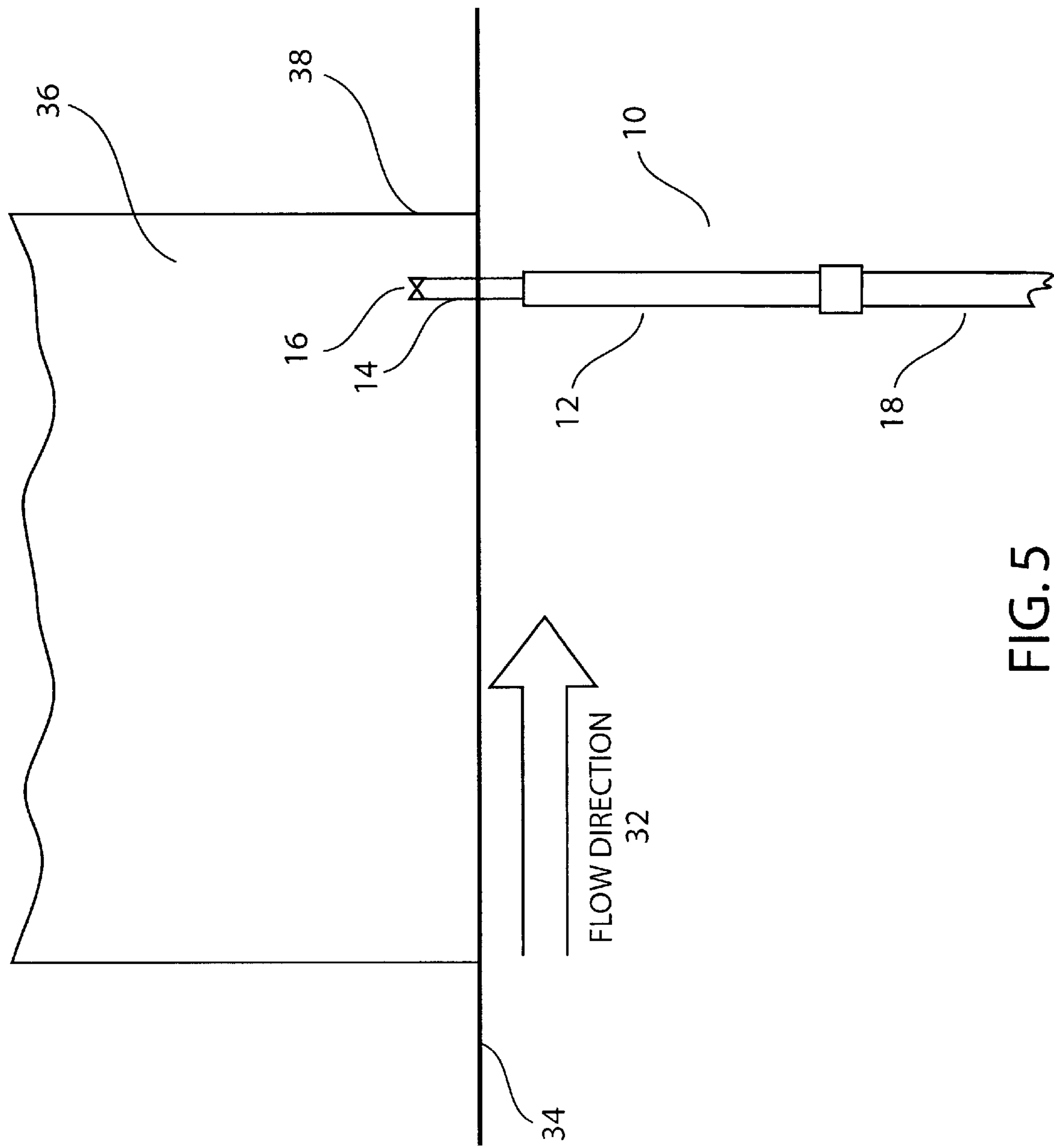
FIG. 5 is a diagrammatic horizontal sectional view, taken along line 5—5, of the aperture shown in FIG. 4, also showing an inventive probe such as shown in FIG. 1.
Figure 6:
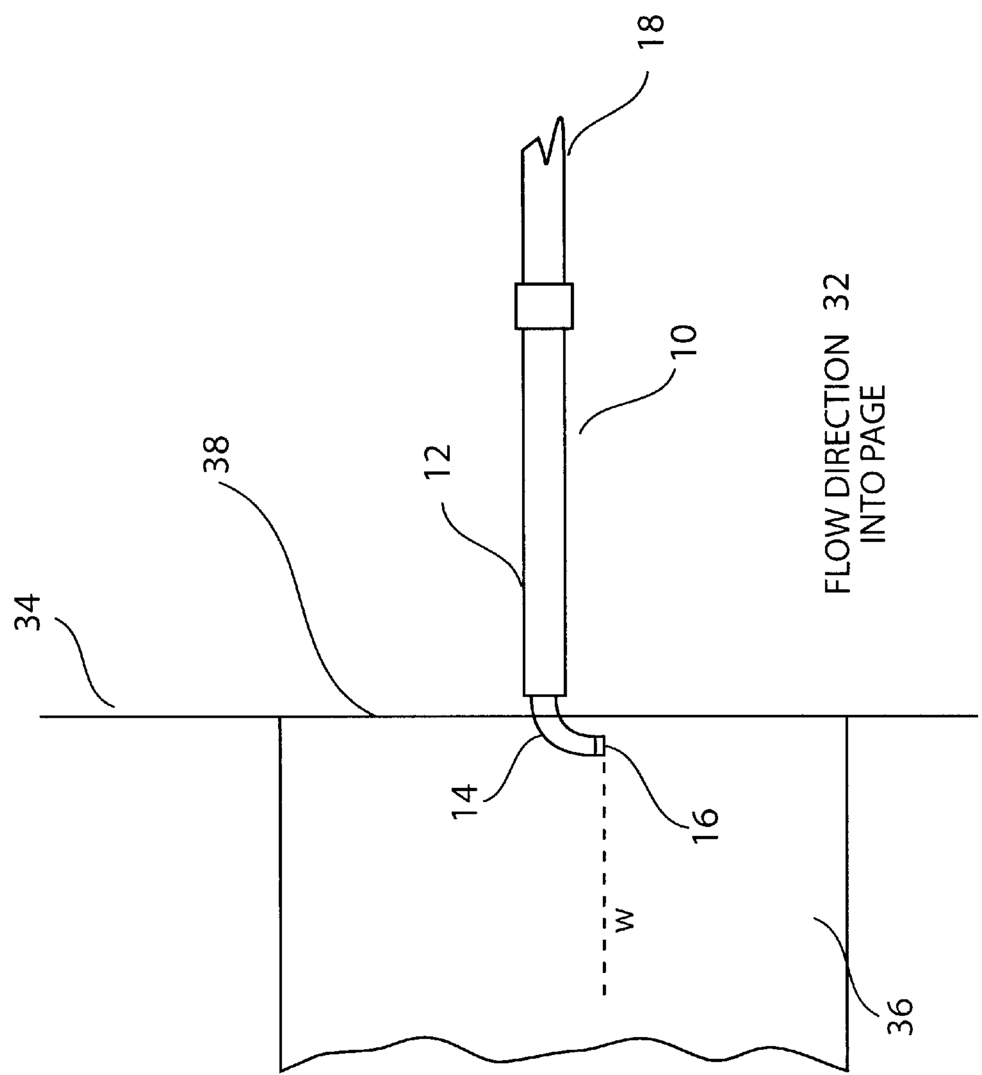
FIG. 6 is a diagrammatic vertical sectional view, taken along line 6—6, of the aperture shown in FIG. 4, also showing an inventive probe such as shown in FIG. 1.

In inventive practice, inventive probe 10 can be oriented in any direction. With reference to FIG. 4, FIG. 5 and FIG. 6, a preferred inventive implementation is to orient inventive probe 10 in cross-flow fashion, perpendicular to the primary fluid flow direction 32. Inventive probe 10 is thus oriented so that the two wires 16 form an "x" in a measurement plane which is normal to the boundary, wall 34; that is, cross-wire plane w is normal to wall 34. Thus oriented, the four prongs 14 curve in the cross-stream direction and the probe body 12 and support 18 are aligned normal to the wall 34. Inventive probe 10 may then be easily moved to locations as far inside and outside the aperture 36 as the supporting structure 18 allows. More importantly, inventive probe 10 may be moved as close to the downstream edge 38 of aperture 36 as would be allowed by the diameter d of probe body 12.

As shown in FIG. 1, probe body 12 is characterized by a diameter d, a length l, a forward section length l' and an aft section length l". Length l approximately equals the sum of forward section length l' and aft section length l". Aft section length l" is that portion of body 12 which is in the vicinity of aft body end 24 and which engages probe support 18. Prong configuration 26 is characterized by a radius of curvature r. The inventive prototype probe 10 used for inventive testing was custom-made for the inventor to the inventor's specifications by TSI Incorporated, Laser Diagnostic Instruments, P.O. Box 64204, St. Paul, Minn., 55164, Internet website http://www.tsi.com. According to this inventive prototype probe 10, body 12 had a diameter d of about 0.12 inches (3.2 mm) and a length l of about 1.50 inches (38 mm), and prong configuration 26 had a radius of curvature r of about 0.5 inches (12.7 mm).

According to this inventive testing, measurements of cavity pressure were made using a one-half inch (0.5 inch) microphone; measurements of the flow field in an aperture (such as aperture 36 shown in FIG. 4 through FIG. 6) were made using a constant temperature anemometer (CTA) such as CTA 40 symbolically represented in FIG. 1. Prototype inventive probe 10 was inventively custom-designed so that measurements could be made inside the aperture 36 at locations close to the downstream edge 38 of aperture 36. Prototype inventive probe 10 was connected to CTA 40. Prototype inventive probe 10 and probe support 18 were mounted inside the tunnel test section on a motorized traverse system which was used to control the location of the inventive prototype probe 10.

In the light of this disclosure, it will be understood by the ordinarily skilled artisan that the present invention, in its numerous embodiments, will provide diverse bend shapes of the prongs. Depending on the inventive embodiment, the prongs can be characterized by a bentness (e.g., curvature) which, as compared with the bentness shown in FIG. 1 through FIG. 3, is characterized by one or more of the following: (i) approximate congruity or similarity; or (ii) greater rectilinearity; (iii) greater curvilinearity; (iv) greater sharpness or abruptness, or less gradualness (e.g., tending more toward a right-angled form and less toward a diagonal linear form); or, (v) less sharpness or abruptness, or more gradualness (e.g., tending more toward a diagonal linear form and less toward a right-angled form).

According to some inventive embodiments, an advantage may reside in a more diagonally-tending (less right-angled tending) prong form, since the smaller total length characteristic of the more diagonally-tending prongs may be associated with a lesser degree of disruption to the fluid flow. Another factor to be considered in selecting prong shape is the probe geometry which will best advance the inventive practitioner's objective to reach desired locations in the context of a particular application.

Other embodiments of this invention will be apparent to those skilled in the art from a consideration of this specification or practice of the invention disclosed herein. Various omissions, modifications and changes to the principles described may be made by one skilled in the art without departing from the true scope and spirit of the invention which is indicated by the following claims.

What is claimed is:

1. A fluid velocity measurement device comprising an approximately linear oblong body, a set of nonlinear prongs and a cross-wire combination, said body being approximately characterized by a geometric longitudinal body axis, said body having a first body axial extremity and a second body axial extremity, said first body axial extremity and said second body axial extremity being at opposite longitudinally axial extremes of said body, said prongs protruding from said body at said first body axial extremity, said nonlinear prongs having corresponding prong tips distanced from said first body axial extremity, said cross-wire combination communicating with said prong tips, said nonlinear prongs and said body together approximately defining a geometric device plane passing therethrough, said cross-wire combination approximately defining a geometric cross-wire plane passing therethrough, said cross-wire plane and said body axis being approximately parallel to each other, said cross-wire plane and said device plane being approximately perpendicular to each other, said device being adaptable to electrical connection with a hot-wire anemometer at said second body axial extremity, said set of nonlinear prongs including four nonlinear prongs which are approximately congruously nonlinear, said cross-wire combination including two electrically conductive wires which are disposed next to each other in approximately perpendicular crisscross fashion, said four nonlinear prongs securing said two electrically conductive wires at the ends of said electrically conductive wires, said two electrically conductive wires corresponding respectively to the x and y components of a fluid velocity vector, said hot-wire anemometer being capable of determining fluid velocity based on the temperature and electrical current associated with said two electrically conductive wires.

2. A fluid velocity measurement device as recited in claim 1, said body being adaptable to engagement with supporting means at said second body axial extremity.

3. A fluid velocity measurement device as recited in claim 1, said body being generally cylindrical.

4. A fluid velocity measurement device as recited in claim 1, wherein said nonlinear prongs narrow at said prong tips.

5. Apparatus for measuring fluid flow velocity, said apparatus including a hot-wire probe for association with a hot-wire anemometer, said hot-wire probe comprising an approximately straight elongate body, four approximately equivalently bent prongs and two approximately perpendicularly oriented sensor wires for conducting electrical current, wherein:

said body has a fore body end and an aft body end;

said body approximately defines an imaginary longitudinal body axis;

said four prongs together approximately describe an approximately unitarily bent prong configuration;

said prong configuration has a fore prong configuration end and an aft prong configuration end;

said prongs each project from said body at said fore body end so that said aft prong configuration end is adjacent said fore body end;

said prong configuration approximately defines an imaginary longitudinal prong axis approximately characterized by the unitary bend approximately described by said four prongs;

said probe approximately defines an imaginary probe plane;

said body axis and said prong axis each approximately lie in said probe plane;

said four prongs hold said two sensor wires so that said two sensor wires are each held by two said prongs at said fore prong configuration end;

said two sensor wires cross each other in contiguous relation to each other so as to approximately describe an "X" shape and so as to approximately define an imaginary cross-wire plane;

said cross-wire plane is disposed approximately parallel in relation to said body axis;

said cross-wire plane is disposed approximately perpendicular in relation to said probe plane;

said hot-wire probe is adaptable to connection with said hot-wire anemometer at said aft body end;

said four prongs hold said two sensor wires at the extremes of said sensor wires;

said two sensor wires are a first sensor wire and a second sensor wire, said first sensor wire corresponding to the x component of a fluid velocity vector, said second sensor wire corresponding to the y component of said fluid velocity vector; and said fluid flow velocity relates to the heat loss characterizing said two sensor wires when interacting with a fluid.

6. Apparatus according to claim 5, wherein:

said prong configuration includes a prong configuration section at said fore prong configuration end;

said prong configuration section approximately defines an imaginary longitudinal prong section axis;

said prong axis includes said prong section axis;

said prong section axis is disposed approximately perpendicular in relation to said body axis; and said prong section axis is disposed approximately perpendicular in relation to said cross-wire plane.

7. Apparatus according to claim 5, wherein said apparatus includes means for holding said hot-wire probe at said aft body end.

8. Apparatus according to claim 7, wherein said apparatus includes said hot-wire anemometer connected to said probe at said aft body end.

9. Apparatus according to claim 5, wherein said apparatus includes said hot-wire anemometer connected to said probe at said aft body end.

10. Apparatus according to claim 5, wherein said body is approximately characterized by a cylindrical shape.

11. Apparatus according to claim 5, wherein said nonlinear prongs are more slender at said fore prong configuration end than at said aft prong configuration end.

12. A method for effecting measurement of fluid flow velocity in the vicinity of the downstream edge of an aperture, wherein said fluid flow is approximately characterized by a flow direction, and wherein said method comprises the steps of:

providing a fluid velocity measurement device, said device including an approximately linear oblong body, a set of nonlinear prongs and a cross-wire combination, said body being approximately characterized by a geometric longitudinal body axis, said body having a first body axial extremity and a second body axial extremity, said first body axial extremity and said second body axial extremity being at opposite longitudinally axial extremes of said body, said prongs protruding from said body at said first body axial extremity, said nonlinear prongs having corresponding prong tips distanced from said first body axial extremity, said cross-wire combination communicating with said prong tips, said nonlinear prongs and said body together approximately defining a geometric device plane passing therethrough, said cross-wire combination approximately defining a geometric cross-wire plane passing therethrough, said cross-wire plane and said body axis being approximately parallel to each other, said cross-wire plane and said device plane being approximately perpendicular to each other, said device being adaptable to electrical connection with a hot-wire anemometer at said second body axial extremity, said set of nonlinear prongs including four nonlinear prongs which are approximately congruously nonlinear, said cross-wire combination including two electrically conductive wires which are disposed next to each other in approximately perpendicular crisscross fashion, said four nonlinear prongs securing said two electrically conductive wires at the ends of said electrically conductive wires, said two electrically conductive wires corresponding respectively to the x and y components of a fluid velocity vector, said hot-wire anemometer being capable of determining fluid velocity based on the temperature and electrical current associated with said two electrically conductive wires; and positioning said device so that said cross-wire combination is situated in said vicinity, and so that said cross-wire plane is disposed approximately parallel in relation to said flow direction.

13. A method according to claim 12, wherein said positioning includes using a support structure for supporting said device.

14. A method according to claim 13, wherein said method further comprises electrically connecting said device to a hot-wire anenometer.

15. A method according to claim 14, wherein said hot-wire anenometer is a constant temperature anenometer.

16. A method according to claim 12, wherein said method further comprises electrically connecting said device to said hot-wire anenometer.

17. A method according to claim 16, wherein said hot-wire anenometer is a constant temperature anenometer.

18. A method according to claim 12, wherein said nonlinear prongs narrow at said prong tips.

* * * * *